(12) United States Patent
Kato

(10) Patent No.: US 8,099,069 B2
(45) Date of Patent: Jan. 17, 2012

(54) BROADCAST RECEIVER FOR USE IN MOBILE COMMUNICATION TERMINAL

(75) Inventor: Akira Kato, Takatsuki (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 126 days.

(21) Appl. No.: 12/731,221

(22) Filed: Mar. 25, 2010

(65) Prior Publication Data

US 2010/0178889 A1 Jul. 15, 2010

Related U.S. Application Data

(63) Continuation of application No. PCT/JP2008/066821, filed on Sep. 18, 2008.

(30) Foreign Application Priority Data

Sep. 28, 2007 (JP) .................................. 2007-254843

(51) Int. Cl.
 H04B 1/18 (2006.01)
 H04B 1/10 (2006.01)
(52) U.S. Cl. ...................... 455/193.3; 455/290; 455/311
(58) Field of Classification Search ............... 455/193.1, 455/193.3, 290, 296, 311
See application file for complete search history.

(56) References Cited

U.S. PATENT DOCUMENTS

| 2002/0193088 A1* | 12/2002 | Jung ......................... 455/191.2 |
| 2004/0048594 A1 | 3/2004 | Okanobu |

FOREIGN PATENT DOCUMENTS

| EP | 1 398 930 A1 | 3/2004 |
| EP | 1 594 226 A1 | 11/2005 |
| JP | 5-83151 A | 4/1993 |
| JP | 7-235885 A | 9/1995 |
| JP | 8-154029 A | 6/1996 |
| JP | 9-64769 A | 3/1997 |
| JP | 10-247860 A | 9/1998 |
| JP | 2001-196837 A | 7/2001 |
| JP | 2003-289259 A | 10/2003 |
| JP | 2004-363854 A | 12/2004 |
| JP | 2007-215040 A | 8/2007 |

OTHER PUBLICATIONS

Official Communication issued in International Patent Application No. PCT/JP2008/066821, mailed on Oct. 14, 2008.

* cited by examiner

*Primary Examiner* — Nguyen Vo
(74) *Attorney, Agent, or Firm* — Keating & Bennett, LLP

(57) ABSTRACT

A broadcast receiver for use in a mobile communication terminal includes a receiving antenna and an antenna tuning circuit connected to the receiving antenna. The receiving antenna receives broadcast signals tuned to the resonant frequency of the antenna tuning circuit by changing the resonant frequency. The antenna tuning circuit includes an unwanted voltage suppression circuit that suppresses an unwanted voltage generated due to the rectification effect of a varactor when the receiving antenna receives transmission signals output from the transmission antenna of the mobile communication terminal.

6 Claims, 2 Drawing Sheets

BROADCAST RECEIVER FOR USE IN MOBILE COMMUNICATION TERMINAL

BACKGROUND OF THE INVENTION

1. Field of the Invention

The present invention relates to a broadcast receiver for use in a mobile communication terminal.

2. Description of the Related Art

In recent years, mobile communication terminals, such as cell phones, for example, with which the user can receive mobile broadcasts and view and listen to video, audio, and other media of the mobile broadcasts have been widely used. In Japan, digital terrestrial broadcasting using one segment (one-seg) targeted for mobile communication terminals began in 2005 and one-seg-capable cell phones have rapidly appeared.

One-seg-capable cell phones include a receiving antenna for receiving broadcast signals and an antenna tuning circuit connected to the receiving antenna. A typical reception system is a tuning-type system. Specifically, a tuning-type system is a system in which, by applying a proper tuned voltage, an antenna tuning circuit defines a resonant circuit that resonates at frequencies equal to channel frequencies being received and only a required frequency band is received by an antenna. A quarter-wavelength whip antenna is suitable for this antenna in view of the characteristics of cell phones.

FIG. 4 shows a configuration of a broadcast receiver for use in a mobile communication terminal according to the related art. In FIG. 4, reference numeral 1 represents a receiving antenna, reference numeral 2 represents an antenna tuning circuit, reference numeral 4 represents a tuned voltage application circuit, AMP1 represents an amplifier, MIX1 represents a frequency mixer, and reference numeral 10 represents a local oscillator. The antenna tuning circuit 2 includes a tuning coil L10 and a varactor D10, which define a resonant circuit.

When a voltage output from the tuned voltage application circuit 4 is applied to the varactor D10, the receiving antenna 1 receives broadcast signals tuned to the resonant frequency of the resonant circuit including the varactor D10 and tuning coil L10. The received signals are input into the frequency mixer MIX1 via the amplifier AMP1. Simultaneously, signals output from the local oscillator 10 are input into the frequency mixer MIX1. The frequency mixer MIX1 mixes these signals to generate intermediate-frequency signals, which are then output to an intermediate-frequency signal output terminal 12. Adjustment of a voltage output from the tuned voltage application circuit 4 can change broadcast signals to be received by the antenna 1, thereby receiving desired broadcast signals.

Japanese Unexamined Patent Application Publication No. 2003-289259 discloses an example of a broadcast receiver according to the related art.

When the receiving circuit described in FIG. 4 is applied to a one-seg-capable cell phone, the following problem occurs.

A cell phone, which is receiving broadcast signals, may transmit transmission signals to a base station via a transmission antenna (not shown) in order to transmit the location of the cell phone. In this case, the transmission signals transmitted to the base station may induce a high-frequency voltage in the receiving antenna 1. Due to such a high-frequency voltage, the resonant frequency of the antenna tuning circuit 2, which is set to match a receiving frequency corresponding to a desired channel, deviates from the receiving frequency. This results in a degradation of the reception sensitivity and the reception quality in the desired channel.

SUMMARY OF THE INVENTION

To overcome the problems described above, preferred embodiments of the present invention prevent a phenomenon in which, in a broadcast receiver in a mobile communication terminal, the resonant frequency of an antenna tuning circuit deviates due to an unwanted voltage induced when a receiving antenna receives transmission signals outputted from a transmission antenna of the mobile communication terminal itself.

A broadcast receiver for use in a mobile communication terminal according to a preferred embodiment of the present invention includes a receiving antenna, and an antenna tuning circuit connected to the receiving antenna. The broadcast receiver is arranged to receive a broadcast signal tuned to a resonant frequency of the antenna tuning circuit by changing the resonant frequency and the antenna tuning circuit includes a varactor having a cathode connected to the receiving antenna and an anode connected to a ground at least in an alternating manner, a tuned voltage application circuit that applies a tuned voltage to a contact between the receiving antenna and a varactor, and an unwanted voltage suppression circuit that suppresses an unwanted voltage generated due to a rectification effect of the varactor when the receiving antenna receives a transmission signal output from a transmission antenna of the mobile communication terminal.

The unwanted voltage suppression circuit may preferably apply a calibration voltage to the contact between the varactor and the ground, the calibration voltage being identical or substantially identical to the unwanted voltage. The calibration voltage is preferably obtained by converting a pulse signal output from a CPU of the mobile communication terminal into a direct-current voltage via a low-pass filter.

The unwanted voltage suppression may preferably subtract a calibration voltage from the tuned voltage, the calibration voltage being identical or substantially identical to the unwanted voltage, and output the resultant voltage.

The unwanted voltage suppression circuit preferably stores a reference table in which a relationship among a frequency of the broadcast signal to be received, transmission power of the transmission signal, and the calibration voltage is defined so that the calibration voltage is properly selected according to the frequency of the broadcast signal to be received.

An output voltage of the antenna tuning circuit extracted from the contact between the receiving antenna and the varactor may preferably be applied to an amplifier, and a capacitor may preferably be arranged in series between the antenna tuning circuit and the amplifier.

According to the configuration described above, a preferred embodiment of the present invention includes the unwanted voltage suppression circuit that cancels out the unwanted voltage induced in the receiving antenna. This prevents the resonant frequency of the antenna tuning circuit from deviating due to the unwanted voltage, thereby preventing the degradation of reception sensitivity.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
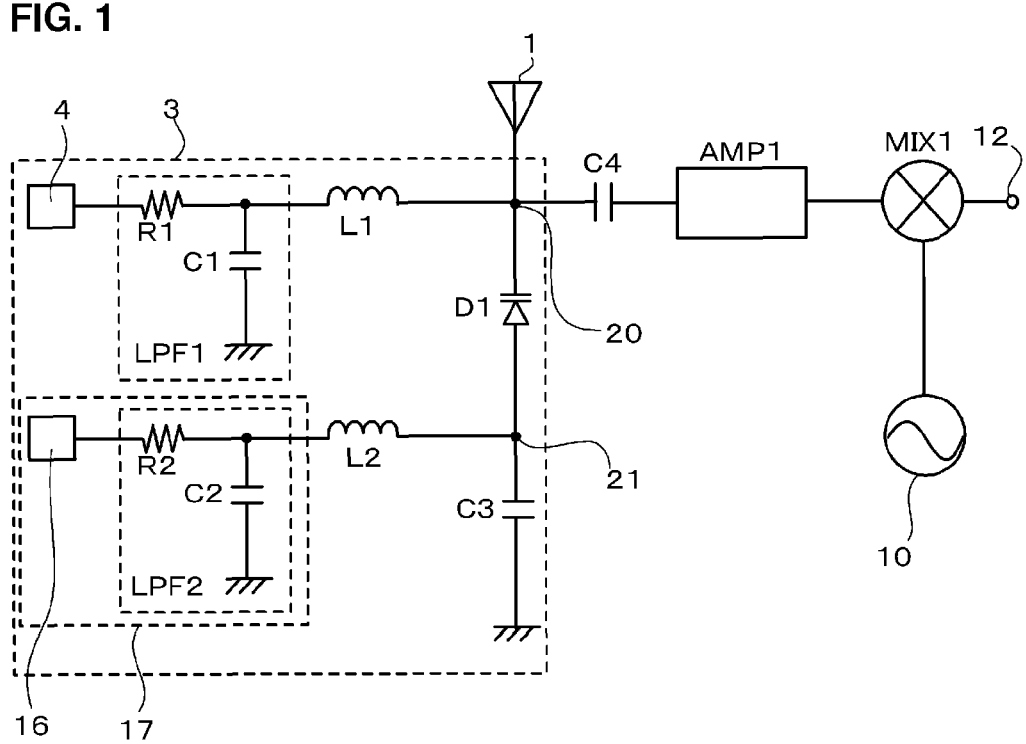
FIG. 1 is an electrical circuit diagram showing a configuration according to a first preferred embodiment of the present invention.
Figure 4:
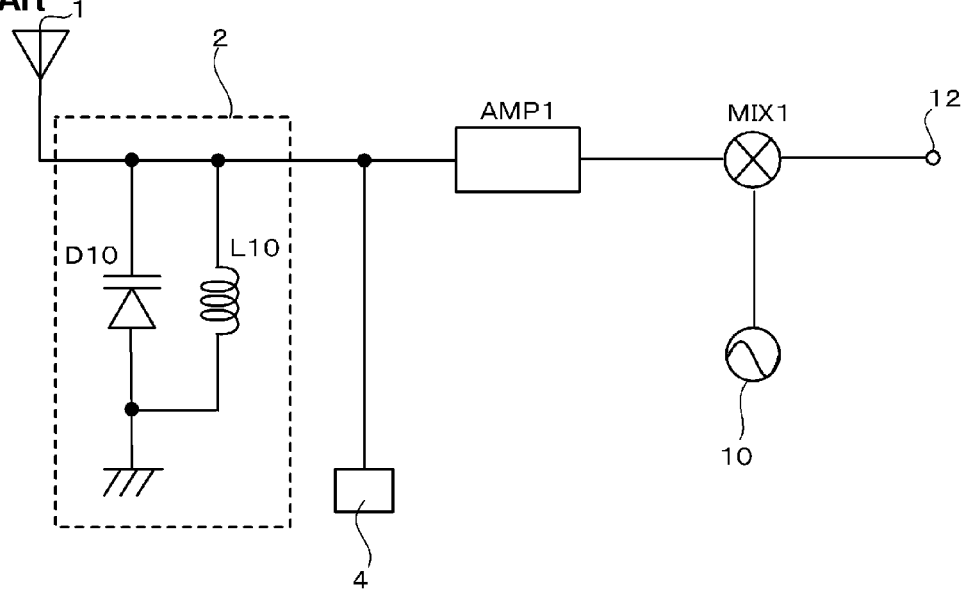
FIG. 4 an electrical circuit diagram showing a configuration of a broadcast receiver for use in a mobile communication terminal according to the related art.

FIG. 1 is an electrical circuit diagram showing a configuration according to a first preferred embodiment of the present invention. In FIG. 1, elements having the same configurations as those shown in FIG. 4 representing a related-art example are given the same reference numerals.

A broadcast receiver for use in a mobile communication terminal according to this preferred embodiment includes a receiving antenna 1, an antenna tuning circuit 3, an amplifier AMP1, a frequency mixer MIX1, and a local oscillator 10. A capacitor C4 is arranged between the antenna tuning circuit 3 and amplifier AMP1.

The receiving antenna 1 receives broadcast signals having a frequency tuned to the resonant frequency of the antenna tuning circuit 3. The received signals are input into the frequency mixer MIX1 via the amplifier AMP1. Simultaneously, signals output from the local oscillator 10 are input into the frequency mixer MIX1. The frequency mixer MIX1 mixes these signals to generate intermediate-frequency signals, which are then output to the intermediate-frequency signal output terminal 12. The intermediate-frequency signals are demodulated so that broadcasting of video, audio, and other media can be viewed and listened to. This system is usually called a "super-heterodyne system."

The antenna tuning circuit 3 includes a varactor D1. The signals received by the receiving antenna 1 are applied to the cathode of the varactor D1. A tuned voltage application circuit 4 is connected to a contact 20 between the receiving antenna 1 and varactor D1 with a coil L1 and a low-pass filter LPF1 interposed therebetween. The low-pass filter LPF1 includes a resistance R1 and a capacitor C1. The tuned voltage application circuit 4, which is included in the CPU of the mobile communication terminal, outputs pulse signals, i.e., pulse width modulation (PWM) signals. The low-pass filter LPF1 and coil L1 convert the PWM signals into direct-current voltages, which are then applied to the contact 20 between the receiving antenna 1 and varactor D1.

In FIG. 1, a capacitor C4 is arranged in series between the antenna tuning circuit 3 and amplifier AMP1. For this reason, the direct-current voltages generated by the low-pass filter LPF1 and coil L1 are applied to the cathode of the varactor D1 rather than input into the amplifier AMP1.

The anode of the varactor D1 is connected to the ground via a capacitor C3. That is, the anode of the varactor D1 is grounded in an alternating manner. A calibration voltage application circuit 16 is connected to a contact 21 between the varactor D1 and capacitor C3 with a low-pass filter LPF2 and a coil L2 interposed therebetween. The low-pass filter LPF2 also includes a resistance R2 and a capacitor C2. As with the above-mentioned tuned voltage application circuit 4, the calibration voltage application circuit 16 is included in the CPU of the mobile communication terminal. The low-pass filter LPF2 and coil L2 convert PWM signals output from the calibration voltage application circuit 16 into direct-current voltages, which are then applied to the contact 21 between the varactor D1 and capacitor C3.

The capacitor C3 is inserted in series between the anode of the varactor D1 and ground. For this reason, the direct-current voltages generated by the low-pass filter LPF2 and coil L2 are applied to the anode of the varactor D1.

The antenna tuning circuit 3 having the above-described configuration defines a resonant circuit. The resonant frequency of the antenna tuning circuit 3 is determined according to a tuned voltage output from the tuned voltage application circuit 4, and the receiving antenna 1 receives broadcast signals having the same frequency as the resonant frequency.

When the mobile communication terminal transmits radio waves to a base station via a transmission antenna (not shown) during reception of a broadcast in order to transmit its own location, the receiving antenna 1 receives the radio waves transmitted by the mobile communication terminal itself, thereby inducing a high-frequency voltage. Due to the rectification effect of the varactor D1, the high-frequency voltage acts as an unwanted voltage, which negatively affects tuning performed by the antenna tuning circuit 3. However, this preferred embodiment includes the calibration voltage application circuit 16, such that the unwanted voltage can be cancelled out.

Specifically, this preferred embodiment includes an unwanted voltage suppression circuit 17 including the calibration voltage application circuit 16 and low-pass filter LPF2. A calibration voltage output from the calibration voltage application circuit 16 and then converted into direct current by the low-pass filter LPF2 and coil L2 are applied to the anode of the varactor D1. As will be described later, the calibration voltage is preferably set to the same or substantially the same voltage as the above-mentioned unwanted voltage, such that the generated unwanted voltage is cancelled out or suppressed by the calibration voltage output from the unwanted voltage suppression means 17. For this reason, even when a high-frequency voltage is induced, the voltage between the anode and cathode of the varactor D1 does not vary or only varies by an insignificant amount. This prevents the resonant frequency of the antenna tuning circuit 3 from deviating from the frequency of broadcast signals to be received. Thus, a phenomenon in which the signals transmitted by the mobile communication terminal itself degrade the digital broadcast reception sensitivity of the terminal is effectively prevented.

The magnitude of unwanted voltage generated with respect to the frequency of broadcast signals to be received will be apparent by measuring the unwanted voltage when the transmission antenna and receiving antenna are installed in the mobile communication terminal and wiring is completed. By previously storing a reference table, in which calibration voltages to be applied according to the frequencies of broadcast signals to be received are defined, in the unwanted voltage suppression circuit 17 based on the measurement results, the calibration voltage can be selected accurately.

In this preferred embodiment, the calibration voltage and tuned voltage are output from the CPU of the mobile communication terminal. As described above, the calibration voltage and tuned voltage are determined according to the frequency of broadcast signals to be received, such that it is preferable to previously store the reference table that represents the relationship between the frequency of broadcast signal and the calibration and tuned voltages. Also, the unwanted voltage generated by the radio waves transmitted by the mobile communication terminal are proportionate to the power of the transmitted radio waves (transmission power), so transmission power setting information (relationship between the transmission power and calibration voltage) is also added to the above-described reference table. Specifically, a method by which the above-described reference table is written into the ROM of the CPU is preferably. This enables receiving desired broadcast signals easily and accurately.

In this preferred embodiment, the unwanted voltage can be cancelled out by using the calibration voltage application circuit 16 as the unwanted voltage suppression circuit 17. This prevents a phenomenon in which the resonant frequency of the antenna tuning circuit 3 deviates due to the unwanted voltage. Accordingly, degradation of digital broadcast receiving sensitivity is effectively prevented.

This preferred embodiment includes the unwanted voltage suppression circuit 17 including the calibration voltage application circuit 16 and low-pass filter LPF2. However, the present invention is not limited thereto. In a case in which the calibration voltage application circuit 16 outputs direct current, there is no need to provide the low-pass filter LPF2. As in this preferred embodiment, use of the unwanted voltage suppression circuit 17 including the calibration voltage application circuit 16 included in the CPU of the mobile communication terminal eliminates the need to provide a new oscillator arranged to output calibration voltages. This simplifies the structure of the broadcast receiver used in a mobile communication terminal.

Similarly, when the tuned voltage application circuit 4 outputs direct current, there is no need to provide the low-pass filter LPF1.

In this preferred embodiment, the tuned voltage application circuit 4 and calibration voltage application circuit 16 output PWM signals. However, the present invention is not limited thereto. A configuration in which other pulse signals, such as pulse frequency modulation (PFM) signals or pulse amplitude modulation (PAM) signals are output may also be used.

Figure 2:
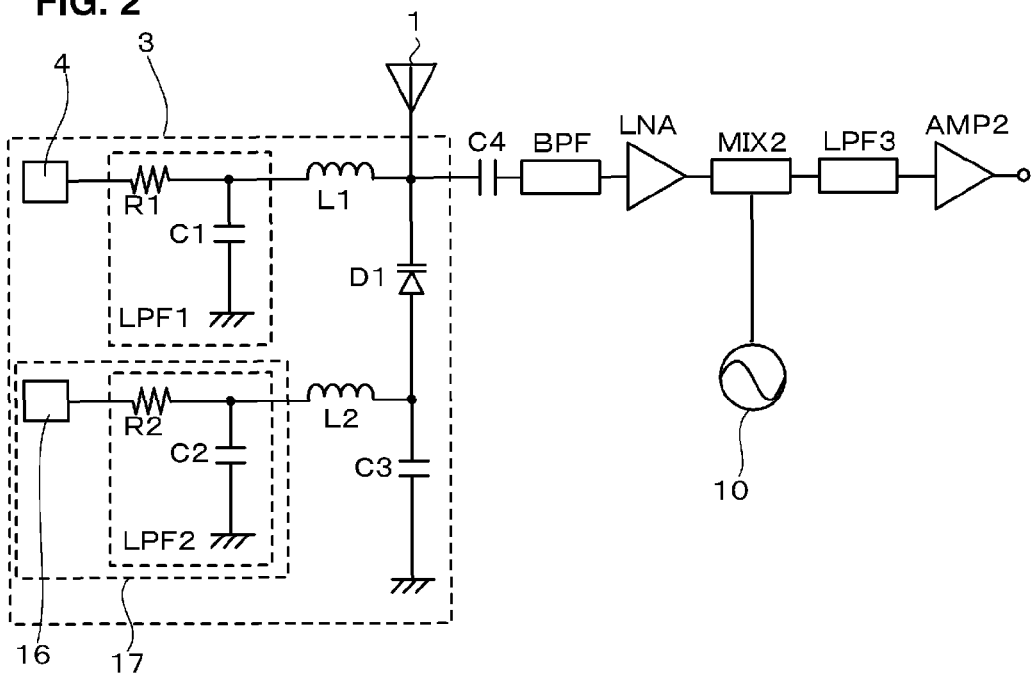
FIG. 2 is an electrical circuit diagram showing a configuration of a modification of the first preferred embodiment of the present invention.

An example in which a super-heterodyne system is preferably used as the conversion system has been described in this preferred embodiment. However, the elements other than the antenna tuning circuit 3 may preferably have any configurations and the demodulation of received signals may be performed according to other systems. Examples of other systems include the direct conversion system shown in FIG. 2. In the direct conversion system, the antenna 1 receives broadcast signals having a frequency tuned to the resonant frequency of the antenna tuning circuit 3. Unwanted signal components are eliminated from the received signals by a band-pass filter BPF and the resultant signals are low-noise amplified by a low-noise amplifier LNA. The signals output from the low-noise amplifier LNA and signals output from the local oscillator 10 are mixed in a frequency mixer MIX2 to amplify only signals having a particular frequency. Subsequently, the amplified signals are passed through a low-pass filter LPF3 and again amplified in an amplifier AMP2 to obtain baseband signals. Unlike the above-mentioned super-heterodyne system, the direct conversion system eliminates the need to temporarily convert the frequency into an intermediate frequency and then demodulate and amplify the intermediate frequency again. This converts signals in a simplified manner.

Second Preferred Embodiment

Figure 3:
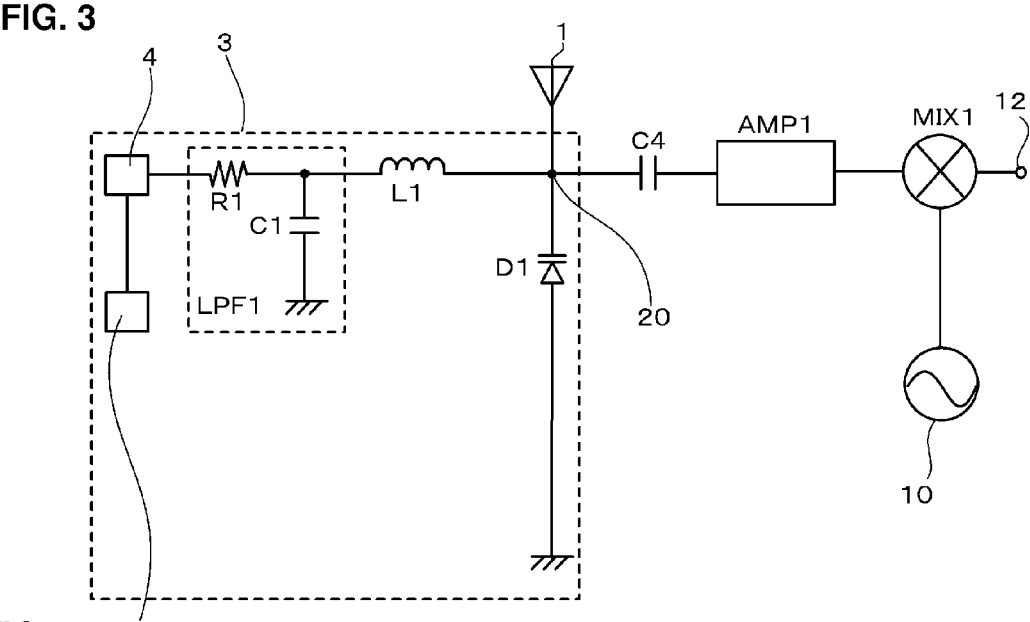
FIG. 3 is an electrical circuit diagram showing a configuration according to a second preferred embodiment of the present invention.

FIG. 3 is an electrical circuit diagram showing a configuration of a second preferred embodiment of the present invention. Elements having the same configurations as those in FIG. 1 are given the same reference numerals and will not be described.

Also in FIG. 3, a receiving circuit for receiving digital broadcasts includes the receiving antenna 1, antenna tuning circuit 3, amplifier AMP1, frequency mixer MIX1, and local oscillator 10. As with the first preferred embodiment, this preferred embodiment may have any configuration except for the receiving antenna 1 and antenna tuning circuit 3. The difference between this preferred embodiment and the first preferred embodiment is that the unwanted voltage suppression circuit is not provided adjacent to the anode of the varactor D1 of the antenna tuning circuit 3.

In this preferred embodiment, the antenna tuning circuit 3 includes the varactor D1, and signals received by the receiving antenna 1 are applied to the cathode of the varactor D1. The tuned voltage application circuit 4 and an unwanted voltage suppression circuit 18 are connected to the contact 20 between the receiving antenna 1 and varactor D1 with the low-pass filter LPF1 and coil L1 interposed therebetween. The low-pass filter LPF1 includes the resistance R1 and capacitor C1. The anode of the varactor D1 is connected to the ground.

The above-mentioned unwanted voltage suppression circuit 18 subtracts a calibration voltage from a tuned voltage output from the tuned voltage application circuit 4 and outputs the resultant voltage. The calibration voltage is preferably set to the same or substantially the same value as an unwanted voltage to be described. The voltage obtained by subtracting the calibration voltage from the tuned voltage and then converted into direct current by the low-pass filter LPF1 is applied to the cathode of the varactor D1. Accordingly, even when an unwanted voltage occurs, the unwanted voltage can be cancelled out, since the calibration voltage equivalent to the unwanted voltage is previously subtracted. This prevents a phenomenon in which the resonant frequency of the tuning circuit 3 deviates due to the unwanted voltage.

Also in this preferred embodiment, by inputting a reference table in the unwanted voltage suppression circuit 18 in advance so that the calibration voltage is determined according to the frequency of broadcast signals to be received and the transmission power of the mobile communication terminal, the unwanted voltage can be accurately and easily cancelled out.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A broadcast receiver for use in a mobile communication terminal, the broadcast receiver comprising:
    a receiving antenna; and
    an antenna tuning circuit connected to the receiving antenna; wherein
    the broadcast receiver is arranged to receive broadcast signals tuned to a resonant frequency of the antenna tuning circuit by changing the resonant frequency; and
    the antenna tuning circuit includes:
        a varactor including a cathode connected to the receiving antenna and an anode connected to a ground at least in an alternating manner;
        a tuned voltage application circuit arranged to apply a tuned voltage to a contact between the receiving antenna and the varactor; and
        an unwanted voltage suppression circuit arranged to suppress an unwanted voltage generated due to a rectification effect of the varactor when the receiving antenna receives a transmission signal outputted from a transmission antenna of the mobile communication terminal.

2. The broadcast receiver according to claim 1, wherein
a capacitor is arranged in series between the varactor and the ground; and
the unwanted voltage suppression circuit is arranged to apply a calibration voltage between the varactor and the capacitor, the calibration voltage being substantially identical to the unwanted voltage.

3. The broadcast receiver according to claim 2, wherein
the calibration voltage is obtained by converting a pulse signal output from a CPU of the mobile communication terminal into a direct-current voltage via a low-pass filter.

4. The broadcast receiver according to claim 2, wherein the unwanted voltage suppression circuit is arranged to store a reference table or a look-up table in which a relationship among a frequency of the broadcast signal to be received, a transmission power of the transmission signal, and the calibration voltage is defined so that the calibration voltage is properly selected according to the frequency of the broadcast signal to be received.

5. The broadcast receiver according to claim 1, wherein
the unwanted voltage suppression circuit is arranged to subtract a calibration voltage from the tuned voltage, the calibration voltage being substantially identical to the unwanted voltage, and to output the resultant voltage.

6. The broadcast receiver according to claim 1, wherein
an output voltage of the antenna tuning circuit extracted from the contact between the receiving antenna and the varactor is applied to an amplifier, and
a capacitor is disposed in series between the antenna tuning circuit and the amplifier.

* * * * *